United States Patent [19]

Oberpriller et al.

[11] 4,072,026
[45] Feb. 7, 1978

[54] METHOD OF COOLING OF ARTICLES AND MATERIALS

[75] Inventors: Jakob Oberpriller, Baierbrunn; Dolf Dieter Hofmann, Munich, both of Germany

[73] Assignee: Linde Aktiengesellschaft, Wiesbaden, Germany

[21] Appl. No.: 648,100

[22] Filed: Jan. 12, 1976

[30] Foreign Application Priority Data

Dec. 10, 1975 Germany .............................. 2555578

[51] Int. Cl.² ............................................ F25D 13/06
[52] U.S. Cl. ............................................ 62/63; 62/65
[58] Field of Search .................. 62/63, 332, 373, 374, 62/65, 52

[56] References Cited

U.S. PATENT DOCUMENTS

| | | | |
|---|---|---|---|
| 3,427,820 | 2/1969 | Hart ..................................... | 62/65 X |
| 3,507,128 | 4/1970 | Murphy et al. ..................... | 62/332 X |
| 3,881,322 | 5/1975 | Le Diouron .......................... | 62/63 |
| 3,934,987 | 1/1976 | Bivins, Jr. ............................. | 62/52 X |
| 3,952,540 | 4/1976 | Okada et al. ......................... | 62/374 |

*Primary Examiner*—Ronald C. Capossela
*Attorney, Agent, or Firm*—Karl F. Ross

[57] ABSTRACT

A method of chilling articles and materials, especially for the embrittlement thereof prior to comminution, wherein a cooling-gas stream is produced from a deep-cooled liquefied gas and the cooling-gas stream is passed into direct contact with the materials to chill the same. The invention comprises evaporating the liquefied gas to produce a first cold gas stream into indirect heat exchange with an evaporating fluid (of an independent refrigerating cycle) to cool the further gas stream and generate therefrom a second cold gas stream, and mixing the first and second cold gas streams to form a mixture which is brought into direct contact with the materials as part of the cooling thereof.

6 Claims, 3 Drawing Figures

METHOD OF COOLING OF ARTICLES AND MATERIALS

FIELD OF THE INVENTION

The present invention relates to a method of cooling or chilling articles and materials, especially for the embrittlement of such materials prior to or as part of the comminution thereof, with a deep-cooled gas stream at least in part derived from evaporation (vaporization) of a liquefied gas at cryogenic temperatures. More particularly, the invention relates to a method of cooling articles or materials in a cooling zone traversed by a cooling gas in which a cooling gas stream is obtained from a deep-cooled liquefied cooling gas and is brought into heat exchange with the articles or materials to be cooled.

BACKGROUND OF THE INVENTION

In a prior-art process for the cooling of articles or objects with low-temperature gases, especially materials which at their transformation temperatures cannot be comminuted readily or are difficult to comminute, a deep-cooled cold gas at low temperatures is brought into contact with the materials to embrittle them. Directly upon such cooling, the materials may be introduced into a comminuting unit which may employ jet mills, pin mills, abrasion mills, impact mills or other comminuting elements to finely divide the materials. Such materials include plastics (synthetic resins) which are relatively soft at room temperature and which are not readily comminuted to a powder. By the use of deep-cooling processes, such materials can be embrittled to the point that the subsequent milling is capable of breaking up the material or articles and forming a powder therefrom. As the cooling gas, nitrogen has been used most frequently and is often sprayed in a liquid state into the cooling zone.

While such cooling processes have been found to be relatively satisfactory as far as the embrittlement of the materials goes, it has been found recently that the operation of the apparatus for carrying out the cooling involves several difficulties in certain cases. One of these difficulties resides in that the requirements for the liquefied cooling gas differ in accordance with the materials and volumes thereof passed through the apparatus, the nature of the materials, the temperatures and the temperatures to which they must be reduced in order to obtain embrittlement. The apparatus and the liquefied gas supplied is usually dimensioned for the peak requirements and hence the operation becomes uneconomical when for certain temperature ranges the cooling is carried out with liquefied gas exclusively.

OBJECTS OF THE INVENTION

It is the principal object of the present invention to provide a method of cooling of objects or materials which enables a continuous operation of the cooling apparatus to be maintained with variation of the cooling process to the extent necessary for a wide range of cooling operations in an economical and optimal manner.

Another object of the invention is to improve upon earlier methods for the deep cooling of materials to be embrittled prior to comminution which operates more economically than the earlier methods.

Still another object of the invention is to provide a system for the deep cooling of objects and materials of the character described which can accommodate readily variable supply rates of the materials or articles, various temperature ranges and requirements and does not require the entire cooling operation to be carried out with liquefied gas.

Still another object of the invention is to provide a method of cooling objects and materials which is of greater adaptability to the requirements ordained by the types of materials to be comminuted and their comminution temperatures than prior art systems, which affords economies especially with respect to conservation of the liquefied gas which is used, and which improves upon the ability to control the temperatures to which the materials and articles are subjected.

SUMMARY OF THE INVENTION

These objects and others which will become apparent hereinafter are attained, in accordance with the invention, by a process in which a second cooling gas stream is cooled by indirect heat exchange with an evaporating coolant and is mixed with the first cold gas stream derived principally from a liquefied gas.

More particularly, the invention relates to a method of chilling materials, especially for the embrittlement thereof prior to or concurrent with comminution, wherein a cooling-gas stream is produced from a deep-cooled liquefied gas, and the cooling-gas stream is passed into direct contact with the materials to chill the latter. The invention is characterized by the following combination of steps:

a. evaporating the liquefied gas to produce a first cold gas stream;

b. passing a further gas stream, independent of the first cold gas stream, into indirect heat exchange with an evaporating fluid to cool the further gas stream and generate therefrom a second cold gas stream; and c. mixing said first and second cold gas streams to form a mixture thereof which is brought into direct contact with the materials in the cooling thereof within the aforementioned cooling zone.

The use, according to the invention, of a cooling by a liquefied gas and a cooling by a further gas stream which, in turn, is cooled by indirect heat exchange with a vaporizing fluid in a refrigeration unit affords significant advantages over conventional cooling processes in which the entire cold requirement for the system is derived from a single source, generally from the liquefied gas.

Since a portion of the cold requirements of the system can be produced by the refrigerating cycle, the relationship between the cold contributed by the liquefied gas and by the refrigerating cycle can be proportioned to the requirements of the overall cooling process for the objects and materials to be cooled. It has been found that the refrigerating cycle is particularly capable of varying the cold contribution so that, for example, the liquefied gas may supply continuously a portion of the cold required for the overall system and variations in the cold requirements may be accommodated by varying the operating rate of the refrigeration cycle.

Furthermore, the entire cooling apparatus can be economically and rationally operated with the overall control of the process being accomplished with a conventional refrigerating cycle which itself may have a much smaller capacity than the cold requirements of the system as a whole.

Moreover, when the cooling requirements are such that a contribution of cold by the liquefied gas is not necessary, the apparatus can be operated solely with the cold delivered by the refrigeration cycle, although this seldom is the case. Frequently, however, it is found that the contribution of cold by the liquefied gas can be minimal.

For example, it has been found that refrigeration cycles of high efficiency can be made to deliver temperatures at the indirect heat exchangers of as low as 210° Kelvin (K) more economically than such temperatures can be supplied by evaporating a liquefied gas. Thus, when materials or objects are to be cooled to temperatures as low as 210° K, the refrigeration cycle alone may be employed.

For lower temperatures, refrigeration cycles become less economical and indeed, it is difficult to obtain substantially lower temperatures with conventional refrigeration cycles including compressors, condensers, evaporators and like components operating in closed circuit.

Thus the present invention provides that substantially lower temperatures may be accomplished by mixing with the second cold gas stream derived from the indirect heat exchange or evaporator of the refrigeration cycle, a first cold gas stream derived from the deep-cooled liquefied gas, for example, liquefied nitrogen.

Liquefied nitrogen, when used in the deep cooling of objects and materials as described, are capable of economically cooling such materials at temperatures up to about 80° K. Between temperatures of 80° K and 210° K, a range in which many cooling requirements for various objects and materials fall, it has been found that a mixture of the indirectly cooled gas stream and the directly cooled gas stream by evaporation of the liquefied nitrogen, best serves the purpose.

Furthermore, the use of two totally independent cold sources in any case has the advantage that difficulties hitherto encountered by peak loading of the overall cooling apparatus cannot occur. Thus, if the loading exceeds the capacity of the refrigeration cycle, additional quantities of liquefied gas can be drawn upon to supplement the indirect cooling. Conversely, if the cooling supplied by the liquefied gas is insufficient, it is supplemented by the cold contribution of the refrigerating cycle.

According to a feature of the invention, the second cold gas stream, produced by indirect heat exchange in the refrigeration cycle, is passed at least in part in circulation through the cooling zone in which the article or material is to be chilled.

It has been found to be especially advantageous according to the invention when the mixing of the two cold gas streams, (one derived by heat exchange from the independent refrigeration cycle and the other in part by evaporation of the liquefied gas) occurs within the cooling zone and the first cold gas stream is introduced at the cold end of the cooling zone at a temperature which is lower than the temperature at which the second cold gas stream (obtained by indirect heat exchange) is introduced into the cooling zone. This second cold gas stream may be introduced into the cooling zone upstream of the first cold gas stream with respect to the movement of the materials or objects to be treated.

In this mode of operation of the process, the materials to be cooled are most economically brought into contact with the fluid at lowest temperature. For example, the path of the materials may include a precooling zone in which the materials are chilled initially by the mixture of the first and second cold gas streams, a transition zone at which the second cold gas stream is introduced, and an aftercooling zone at which the first cold gas stream is introduced. In general, the materials to be chilled move in a direction opposite to that of the cooling fluids.

Of course, the invention also can provide that the second cooling gas stream exclusively carries out the precooling while the first cold gas stream carries out primarily an aftercooling before being mixed with the second cold gas stream. Thus the final cooling portion of the process is effected by the gas stream derived from the liquefied gas. The entire quantity of cooling gas thus need not be cooled to the lowest temperature to be generated in the cooling system.

The control of the temperature gradient in the cooling zone can thereby be effected either by selection of the point at which mixing of the two cold gas streams takes place (geometrically) within the cooling zone or by variation of the proportions of the two cold gas streams used.

It has been found to be especially economical in such a process when the two cold gas streams are mixed at a point along the cooling zone when they both have approximately the same temperature, i.e. when the first cold gas stream has been warmed up aftercooling of the articles or materials to a temperature approximately equal to that at which the second cold gas stream is introduced.

According to another feature of the invention, especially applicable when very large quantities of cold must be delivered to the articles or objects, the two cold gas streams are mixed externally of the cooling zone and the cold gas from the first cold gas stream, derived from the liquefied gas, is sprayed into the second cold gas stream derived from the indirect heat exchange in the refrigeration cycle. This spraying operation can take place in a mixing chamber immediately ahead of the introduction of the cold gas mixture into the cooling zone. The fluid sprayed into the cold gas stream derived by indirect heat exchange from the refrigeration cycle may in part be the liquid of the liquefied gas which can evaporate in the mixing chamber during the spraying operation.

In this mode of operation, the precooling may also be effected solely or partially by the indirectly cooled gas stream (second cold gas stream), while the deep cooling is carried out predominantly with the liquefied gas, albeit in admixture with the other portion of the cold gas stream derived from the refrigeration cycle.

It is thus contemplated in accordance with the present invention to utilize the two distinct cold sources for separate cooling and various zones of the treatment of the objects or materials to be chilled, in addition to any cooling which may be effected by the mixture of the two gas streams.

When the chilled objects or materials leave the final low-temperature end of the cooling zone they may be the subject to further treatment processes, especially to milling or other comminution.

The cold economies may be preserved when, in accordance with a further feature of the invention, after the further treatment of the materials or objects, e.g. by comminution, the chilled comminuted product is subjected to heat exchange with a portion of the warmed cooling gas mixture.

The apparatus according to the present invention advantageously comprises a cooling chamber having at least one cooling zone and supplied with the articles or materials to be chilled, the latter moving through the cooling zone in one direction.

The cooling chamber is provided with ducts for the cooling gas stream or streams, one of the ducts extending from a heat exchanger of a refrigeration cycle. The latter advantageously is a closed cycle which may have the usual compressor, condenser and evaporator and, for the present purposes, the latter evaporator may be used as the heat exchanger.

Thus the indirect heat exchanger according to the invention may have one compartment or set of flow passages traversed by a vaporizing refrigerant and a second compartment or set of flow passages traversed by the second cooling gas stream, the two compartments or sets of passages being in heat-exchanging relationship, through a conductive wall. Any conventional refrigerating cycle can be used for this purpose, e.g. refrigerant cycles using low boiling point Freons.

According to a feature of the invention, the conduit means can include a duct extending from the heat exchanger to a central region of the cooling chamber or to a central cooling zone thereof as part of a recirculating path for the second cooling gas stream. A return duct can extend from the warm end of the cooling chamber to the warm side of the indirect heat exchanger. The cold end of the cooling is preferably connected to a source of liquefied gas, e.g. liquid nitrogen, so that the cooling gas streams pass generally through the cooling chamber in a direction opposite the direction of movement of the articles or material to be chilled and the first cooling gas stream derived from the liquefied gas is mixed with the second cooling gas stream derived from the heat exchanger in the aforementioned central or intermediate zone. Advantageously, the liquefied gas is admitted to the cold end of the cooling chamber through a spray device whereby the second cold gas stream and some liquefied gas can be sprayed directly onto the articles and materials to be cooled.

The invention also provides that the heat exchanger can be connected via conduit means at its cold end to the cold end of the cooling chamber and at its warm end to the warm end of the cooling chamber in a recirculation path. In this case it is desirable to provide between the heat exchanger and the cold end of the cooling chamber, a mixing chamber into which the liquefied gas of the first cooling gas stream is sprayed. A further duct thus connects a supply vessel for the liquefied gas with this mixing chamber.

The cooling chamber can be a horizontally elongated cooling tunnel through which the objects or materials to be cooled are displaced by a conveyor arrangement. Such cooling tunnels have been found to be especially effective for the chilling (deep cooling or freezing) of foodstuffs. However, it is also possible to provide at the downstream end of the conveyor a further processing device such as a mill for comminuting the object or materials which have been chilled, e.g. in the preparation of regrind from plastics, synthetic-resins or the like.

For cold-comminuting apparatus, however, it is preferred to provide a cooling chamber formed as a vertical shaft and at the mill end to have the shaft communicate directly with a comminuting device such as a jet mill, pin mill, impact mill, attrition mill or the like. For the cooling of some materials or objects, the cooling chamber can have the configuration of a helical or screw-shaped cooling tunnel in which the axis of the helix is vertical. Such an arrangement has the advantage that the objects or materials to be cooled are conveyed by gravity along the extended path of the helix through the cooling tunnel.

In all embodiments of the apparatus for practicing the present invention, the cooling tunnel or chamber can be provided as a single closed unit or as two separate parts which are assembled together. This is advantageous when it is desirable that the two cooling gas streams mix within the cooling zone, in which case the mixing region can lie between the two cooling chamber structures.

The process of the present invention has been found to be applicable to the cooling or chilling of a variety of materials or objects. For example, it has been found to be especially effective for the reworking or comminution of materials which are difficult to subdivide at their transformation temperatures or which cannot be comminuted at these temperatures, e.g. synthetic-resins or certain foodstuffs. It may be used advantageously for the embrittlement of old materials such as scrap and rubber.

We have found further that it can be used wherever deep cooling is required with considerable advantage. For example, it may be employed in freeze-drying of commestibles or other materials, for the freezing of large quantities of rivets or the like and for the cooling of hot products or products which are formed with heat or generate heat such as red lead.

A preferred use of the process and apparatus of the present invention is the chilling and embrittlement of old tires and their comminution and reworking.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
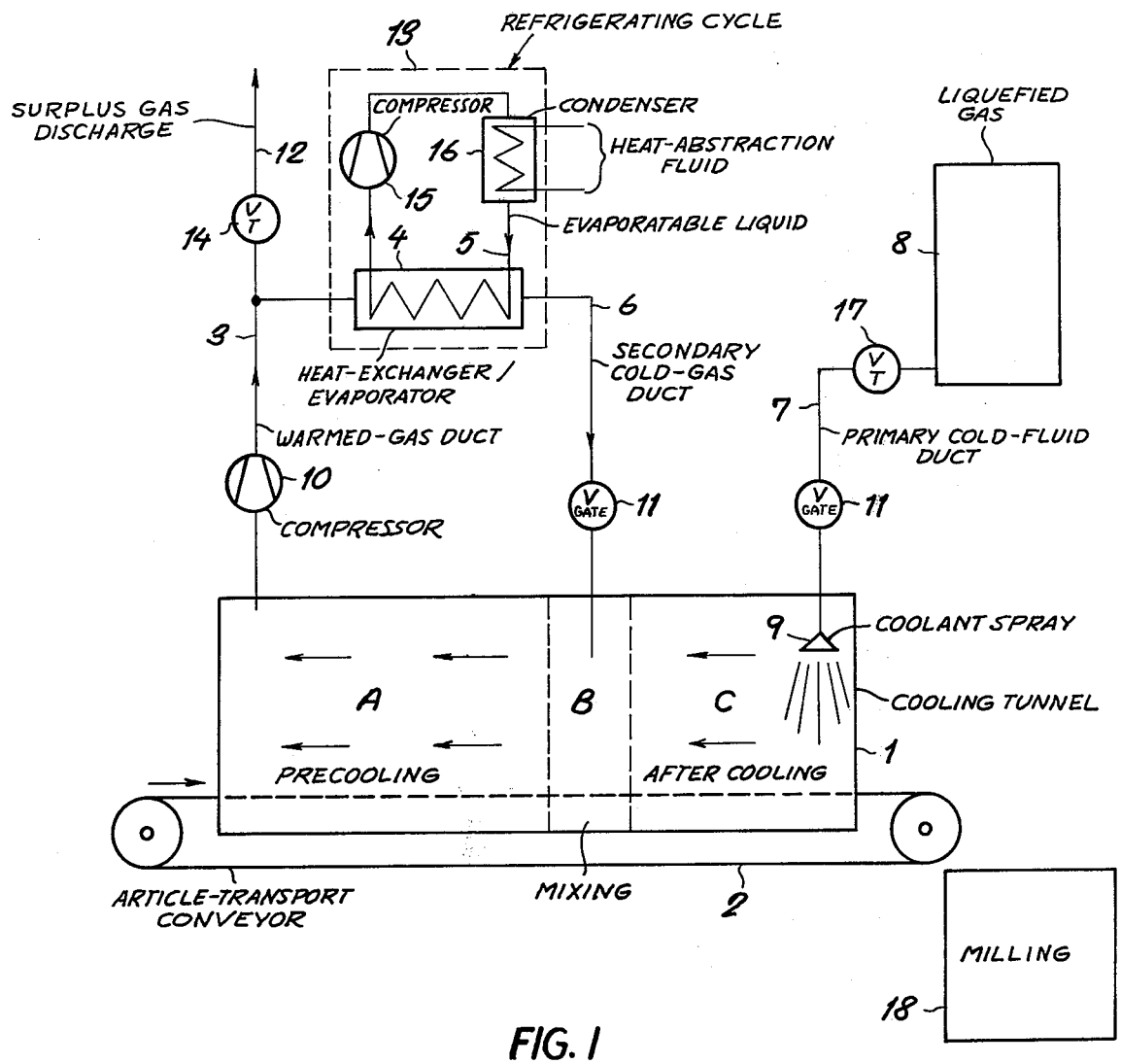
FIG. 1 shows an apparatus according to the invention having a horizontally extending cooling tunnel, especially for the chilling of large objects such as rubber tires, and foods to be frozen.

FIG. 1 shows a cooling tunnel 1 which is horizontally elongated and is formed with three cooling zones A, B, C described in greater detail below. The cooling tunnel is traversed by cooling gases from right to left and by the articles, objects or materials to be chilled from left to right.

The articles or materials are carried by a transport conveyer 2 through the cooling tunnel 1 in countermovement to the flow of the cooling gas streams.

The left hand or warm end of the cooling tunnel is connected by a duct 3 and a compressor 10 to the warm side of a heat exchanger 4 forming an evaporator of a refrigeration cycle 13. The heat exchanger 4 forms the evaporator of the refrigerating cycle 13 which has a duct 5 through which the evaporatable liquid refrigerant is supplied to the heat exchanger 4 to pass in indirect heat exchange with a warm gas conduit from the cooling zone by duct 3. A portion of the warm gas, as controlled by valve 14 can be released at 12 into the atmosphere or recovered for some other purpose as the surplus discharge gas.

The gas recirculated through the indirect heat exchanger 4 and leaving the cold end thereof through a duct 6 constitutes the second or secondary cold gas stream and is returned to the cooling zone via a valve 11.

A further duct 7 is connected to the cold end of the cooling tunnel 1 through a valve 11 to supply the first or primary cold gas stream thereto, this cold gas deriving from the liquefied gas reservoir 8 via a throttle or expansion valve 17. The first gas stream may be formed in part by spraying liquid from vessel 8 entrained in the primary cooling gas stream through the nozzle 9 onto the articles in the cold end of the tunnel 1. The vaporized coolant of the first cooling gas stream then traverses to the left, against the movement of the articles or materials to be cooled, and mixes at an intermediate region of the cooling tunnel with the second cooling gas stream previously cooled in the heat exchanger 4.

The cooling tunnel 1 thus has three zones represented at A, B and C, the first zone constituting a precooling zone and being traversed by the mixture of the cooling gases after each of them has been warmed somewhat in direct heat exchange with the articles or materials to be chilled. The second zone B is a mixing zone in which the second cold gas stream from heat exchanger 4 mixes with the previously warmed gas stream from zone C and derived from the liquefied gas. The mixing of the two cooling gas streams preferably takes place after the first cold gas stream derived from the liquefied gas has been raised to a temperature corresponding to that of the second cold gas stream in the mixing zone B. The third zone C constitutes an aftercooling or final cooling zone at which the articles reach their lowest temperature.

The first gas stream derived from the liquefied gas and sprayed at 9 into the tunnel has a substantially lower temperature than the second cold gas stream delivered by line 6 to the mixing zone B. For example, liquid nitrogen may serve as the liquefied gas and can be introduced by the spray device 9 at a temperature of about 80° K into the cooling tunnel. Depending upon materials to be cooled and the required cooling temperatures, other liquefied gases such as carbon dioxide or argon can be substituted.

Using a conventional compressor-type refrigerating cycle 13, the second cold gas stream can be introduced into the mixing zone B at a temperature of about 210° K. Of course other temperatures for the second cooling gas can also be provided when other refrigerants are used or when an absorption-type refrigerating cycle is substituted.

The mixing of the two cold gas streams takes place in the zone B when the first cold gas stream, after chilling the material, has reached a temperature of about 210° K.

The compressor 10 serves to recirculate the gas of the second cold gas stream while the pressure within the system is maintained both by this compressor and the pressure in the supply vessel 8 for the liquefied gas. Blowers or the like can be provided in the cooling tunnel 1 to induce the gas flow represented therein by the arrows. Control valves 11 and 14 control the ratio of the cooling gases of the first and second cooling gas streams and the discharge of surplus gas from the system. In the embodiment illustrated, a milling stage 18 can be provided at the discharge side of the conveyor for comminuting rubber tires which may be chilled in the tunnel 1.

Figure 2:
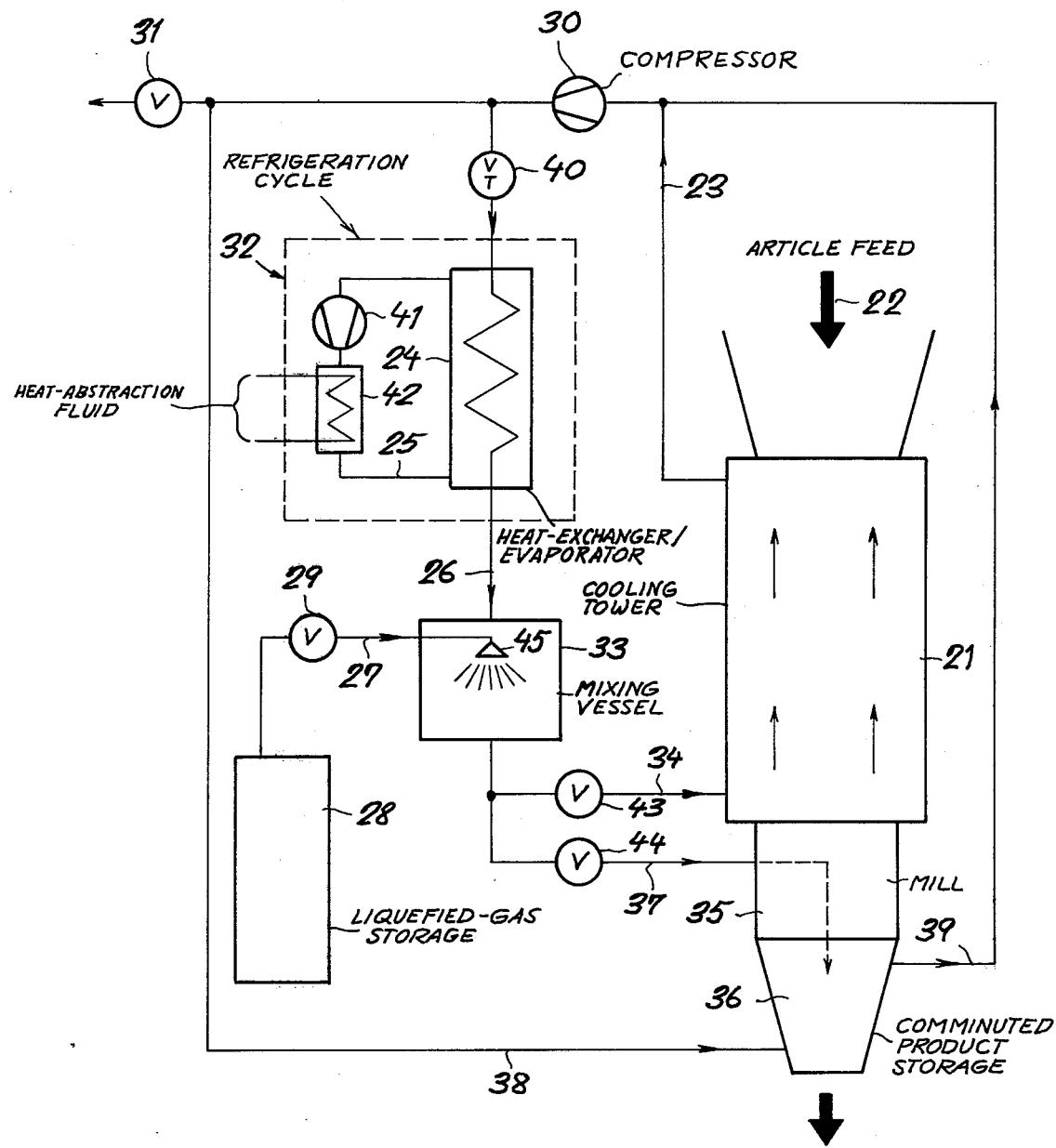
FIG. 2 is a flow diagram showing an apparatus according to the invention for the comminution of materials such as synthetic-resins and other elastomeric or flexible or elastic substances.

The refrigerating cycle may comprise the usual compressor 15 which sprays into a condenser 16 from which heat may be abstracted by a fluid such as water. The condensed product serves as the evaporatable liquid fed at 5 into the evaporator heat exchanger 4. FIG. 2 shows an embodiment of the present invention which utilizes a cooling shaft or tower 21 as part of a cold comminuting apparatus, the cooling zone of which is traversed by a descending movement of the materials to be comminuted while the flow of cooling gas is upward as represented by the arrows. The articles or materials to be comminuted are fed into the shaft as represented at 22.

A duct 23 carries warm gas from the warm end of the cooling zone to a compressor 30 which recirculates part of this gas via valve 40 to the warm end of an indirect heat exchanger 24 forming part of a refrigerating cycle 32. The heat exchanger 24 constitutes the evaporator of the refrigeration cycle 32 which also includes, as described above, a compressor 41 for the refrigerant and a condenser 42 from which heat is abstracted by another fluid such as water. The evaporatable refrigerant is supplied at line 25 to the evaporator 24. As in the embodiment of FIG. 1 the refrigerant cycle is here totally independent of the cooling gas cycles.

The cooled recirculated cooling gas (second cold gas stream) is carried by a duct 26 from the cold end of the indirect heat exchanger 24 to a mixing chamber 33 into which the first cold gas stream is introduced by a duct 27 and a valve 29 through a spray head 45. The first cold gas stream is derived from the liquefied gas storage vessel 28. The liquefied gas, evaporating in heat-exchanging relation with the second cold gas stream and mixing thereto, cools the resulting mixture.

One portion of this cold gas mixture is carried by duct 34 and valve 43 into the cold end of the shaft 21 to chill the material or articles therein to the embrittlement point.

The chilled embrittled articles or materials pass downwardly into a mill 35 and are comminuted therein in accordance with conventional jet or attrition milling principles, the milled product being received in a collection vessel 36. Another portion of the cold gas mixture is carried by line 37 and valve 44 through the mill to serve as the cooling and transport gas for the milled product.

To recover a portion of the cold from the cooled milled product, part of the cold gas stream from compressor 30 is diverted by duct 38 to the collection vessel 36 which here functions as a direct heat exchanger. The cold of the product is picked up by this portion of the gas stream and is carried by duct 39 to the compressor 30 where it is united with the warm gas removed from the cooling zone by line 23. The surplus gas is here discharged through line 31.

Figure 3:
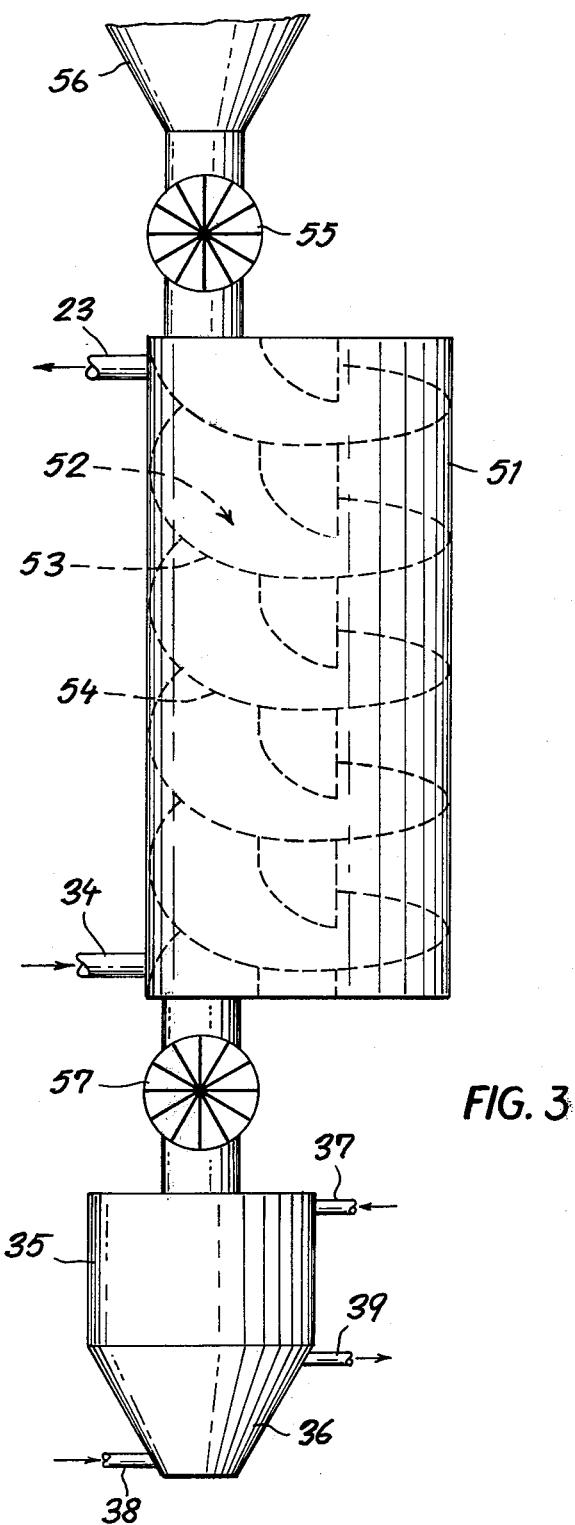
FIG. 3 is a diagrammatic vertical elevational view of a cooling tower which may be substituted for the shaft of the apparatus of FIG. 2.

FIG. 3 shows a shaft-type cooling system which can be substituted for the system represented in FIG. 2, the other elements of the apparatus being the same. In this embodiment, the ducts have been designated with the reference numerals used in FIG. 2 to the extent that they perform corresponding functions. However, the shaft is replaced by a shaft 51 having a helical path 52 defined between perforated walls 53 and 54 for the articles or materials. The material is introduced through a gas-blocking gate 55 and a hopper 56 and the chilled product is discharged through a gas-blocking gate 57 into the mill 35. Since the material must travel along a helical or screw-shaped path in the embodiment the residence time of the product in contact with the cooling gas mixture is increased.

We claim:

1. In a method of chilling articles or materials wherein a cooling gas stream is produced from a deep-cooling liquefied gas, and the cooling gas stream is passed into direct contact with the articles or materials to chill the same, the improvement which comprises:
   a. evaporating said liquefied gas to produce a first cold gas stream;
   b. passing a further gas stream, independent of said first cold gas stream, into direct heat exchange with an evaporating fluid to cool said further gas stream and generate therefrom a second cold gas stream;
   c. mixing said first and said second cold gas streams to form a mixture thereof which is brought into direct contact with said articles or materials in the cooling thereof
   d. circulating said second cold gas stream at least in part through a cooling zone traversed by said articles or materials and having a cold end and a warm end, said cold gas streams being mixed in step (c) within said cooling zone, said first cold gas stream being introduced into said cooling zone at a cold end thereof, said second cold gas stream being introduced into said cooling zone at an intermediate location therealong at a temperature greater than the temperature at which said first cold gas stream is introduced into said cooling zone whereby said second cold gas stream is subjected to heat exchange with said articles or materials;
   e. passing said articles or materials through said zone from said warm end to said cold end in countermovement to the gases traversing said zone; and
   f. removing the mixed gases at said warm end.

2. The improvement defined in claim 1 wherein said cold gas streams mix in said cooling zone at a location approximately corresponding to that at which the cold gas streams have attained the same temperature.

3. The improvement defined in claim 1 wherein said evaporating fluid is a refrigerant forming part of a closed refrigerating cycle independent of said gas streams.

4. In a method of chilling articles or materials wherein a cooling gas stream is produced from a deep-cold liquefied gas, and the cooling gas stream is passed into direct contact with the articles or materials to chill the same, the improvement which comprises:
   a. evaporating said liquefied gas to produce a first cold gas stream;
   b. passing a further gas stream, independent of said first cold gas stream, into direct heat exchange with an evaporating fluid to cool said further gas stream and generate therefrom a second cold gas stream;
   c. mixing said first and said second cold gas stream to form a mixture thereof which is brought into direct contact with said articles or materials in the cooling thereof;
   d. circulating said second cold gas stream at least in part through a cooling zone traversed by said articles or materials and having a cold end and a warm end, said cold gas streams in step (c) being mixed externally of said cooling zone, said first cold gas stream being formed by spraying said liquefied gas into said second cold gas stream before the introduction thereof into said cooling zone; and
   e. passing said articles or materials through said zone from said warm end to said cold end in countermovement to the gases traversing said zone.

5. The improvement defined in claim 4 wherein said articles or materials are subjected, after traversing said cooling zone in counterflow to said cold gas streams, to further processing in a cold state.

6. The improvement defined in claim 5 wherein the product of the treatment of said articles or materials in a cold state is brought into heat exchanging relationship with a warm gas recovered from said zone to cool the latter, said warm gas being recirculated to form said second cold gas stream.

* * * * *